United States Patent
Faust

(10) Patent No.: US 11,046,806 B2
(45) Date of Patent: Jun. 29, 2021

(54) POLYURETHANE, METHOD OF PREPARATION, AND ARTICLE COMPRISING THE POLYURETHANE

(71) Applicant: The University of Massachusetts, Boston, MA (US)

(72) Inventor: Rudolf Faust, Honolulu, HI (US)

(73) Assignee: THE UNIVERSITY OF MASSACHUSETTS, Boston, MA (US)

(*) Notice: Subject to any disclaimer, the term of this patent is extended or adjusted under 35 U.S.C. 154(b) by 283 days.

(21) Appl. No.: 16/334,106

(22) PCT Filed: Sep. 19, 2017

(86) PCT No.: PCT/US2017/052175
§ 371 (c)(1),
(2) Date: Mar. 18, 2019

(87) PCT Pub. No.: WO2018/057488
PCT Pub. Date: Mar. 29, 2018

(65) Prior Publication Data
US 2019/0256641 A1    Aug. 22, 2019

Related U.S. Application Data

(60) Provisional application No. 62/398,569, filed on Sep. 23, 2016.

(51) Int. Cl.
| | |
|---|---|
| *C08G 18/69* | (2006.01) |
| *C08G 18/24* | (2006.01) |
| *C08G 18/32* | (2006.01) |
| *C08G 18/48* | (2006.01) |
| *C08G 18/66* | (2006.01) |
| *C08G 18/76* | (2006.01) |
| *C08G 18/62* | (2006.01) |
| *C08G 18/40* | (2006.01) |

(52) U.S. Cl.
CPC ......... *C08G 18/698* (2013.01); *C08G 18/244* (2013.01); *C08G 18/3206* (2013.01); *C08G 18/4063* (2013.01); *C08G 18/4854* (2013.01); *C08G 18/6208* (2013.01); *C08G 18/6674* (2013.01); *C08G 18/7671* (2013.01)

(58) Field of Classification Search
CPC .............. C08G 18/698; C08G 18/6208; C08G 18/4063; C08G 18/244; C08G 18/3206; C08G 18/4854; C08G 18/6674; C08G 18/7671
See application file for complete search history.

(56) References Cited

U.S. PATENT DOCUMENTS

| | | | |
|---|---|---|---|
| 3,714,110 A | 1/1973 | Verdol et al. | |
| 4,906,673 A | 3/1990 | Mori et al. | |
| 5,864,001 A | 1/1999 | Masse et al. | |
| 5,925,724 A | 7/1999 | Cenens et al. | |
| 5,929,167 A | 7/1999 | Gerard et al. | |
| 6,054,533 A * | 4/2000 | Farkas ................... | C08G 18/69 525/90 |
| 6,323,299 B1 | 11/2001 | Handlin et al. | |
| 6,537,661 B1 * | 3/2003 | Djiauw ..................... | D01F 6/70 428/364 |
| 6,552,153 B1 | 4/2003 | Kaufhold et al. | |
| 2009/0082477 A1 | 3/2009 | Speas | |
| 2010/0179298 A1 | 7/2010 | Faust et al. | |

FOREIGN PATENT DOCUMENTS

| | | |
|---|---|---|
| EP | 0624612 A1 | 11/1994 |
| EP | 0732349 A2 | 9/1996 |
| WO | 9518164 A1 | 7/1995 |
| WO | 9902603 A1 | 1/1999 |
| WO | 2010064612 A1 | 6/2010 |

OTHER PUBLICATIONS

International Search Report and Written Opinion; International Application No. PCT/US17/52175; International Filing Date Sep. 19, 2017; dated Dec. 1, 2017; 13 pages.
Speckhard et al.; "Ultimate Tensile Properties of Segmented Polyurethane Elastomers: Factors Leading to Reduced Properties for Polyurethanes Based on Nonpolar Soft Segments"; Rubber Chemistry and Technology; 59(3); pp. 405-431; (1986).
Technical Paper "Novel Polybutadiene Diols for Thermoplastic Polyurethanes"; from Cray Valley, Resins par excellence; Application Bulletin; http://www.crayvalley.com/docs/technical-paper/novel-polybutadiene-diols-for-tpus.pdf; 8 pages, printed Aug. 18, 2017.

(Continued)

*Primary Examiner* — Rabon A Sergent
(74) *Attorney, Agent, or Firm* — Cantor Colburn LLP

(57) ABSTRACT

A method of preparing a thermoplastic polyurethane includes reacting specific amounts of a hydrogenated polydiene diol, a poly(alkylene oxide) diol, a chain extender, and a diisocyanate in the presence of a solvent. The thermoplastic polyurethane exhibits a desirable balance of tensile strength and tensile elongation. It is useful for fabricating foams, films, fibers, fabrics, coatings, adhesives, automotive instrument panels, power tool casings, casings for mobile electronic devices, sporting goods, clothing, footwear, gloves, condoms, and medical devices, among other articles.

17 Claims, No Drawings

(56) References Cited

OTHER PUBLICATIONS

European Search Report for European App. No. 17853734.6, Filing Date Aug. 5, 2019, dated Aug. 7, 2020, 8 pages.
Cozzens, et al., "Long term in vitro biostability of segmented polyisobutylene-based termoplastic polyurethanes" Journal of Biomedical Materials Research A, Dec. 1, 2010, vol. 95A, Issue 3 (pp. 775-782).
Mishra, et al., "Long-term in vitro hydrolytic stability of thermoplastic polyurethanes" J Biomed Mater Res Part A 2015 :103A:3798-3806.

* cited by examiner

POLYURETHANE, METHOD OF PREPARATION, AND ARTICLE COMPRISING THE POLYURETHANE

CROSS REFERENCE TO RELATED APPLICATIONS

This application is a National Stage application of PCT/US2017/052175, filed Sep. 19, 2017, which claims the benefit of U.S. Application No. 62/398,569, filed Sep. 23, 2016, both of which are incorporated by reference in their entirety herein.

BACKGROUND

Segmented polyurethanes are important materials for medical applications owing to their biocompatibility, design flexibility, and ease of processing. Depending on their composition, thermoplastic polyurethanes (TPUs) can be soft, rubbery, or rigid materials. They can be extruded, injection molded, compression molded, or solution spun. However, polyurethanes based on polyethers and polydienes are highly vulnerable to oxidative degradations. Recently, polyisobutylene-based polyurethanes have been developed, which possess improved oxidative and hydrolytic stability. D. Cozzens, U. Ojha, P. Kulkarni, R. Faust, S. Desai, "Long term in vitro biostability of segmented polyisobutylene-based thermoplastic polyurethanes". *Journal of Biomedical Materials Research Part A,* 2010, volume 95A, number 3, pages 774-782; A. Mishra, K. Seethamraju, J. Delaney, P. Willoughby, R. Faust, "Long-term in vitro hydrolytic stability of thermoplastic polyurethanes", *Journal of Biomedical Materials Research Part A,* 2015, volume 103, number 12, pages 3798-3806. However, polyisobutylene diol is presently expensive and not readily commercially available. Alternatively, hydrogenated polydiene diols, which are relatively inexpensive and available commercially could be used. Polyurethanes made from hydrogenated polydiene diols, however, exhibit poor mechanical performance (i.e., poor tensile strength and ultimate elongation).

There remains a need for segmented polyurethanes derived from readily available materials and exhibiting an improved balance of tensile strength and elongation.

BRIEF SUMMARY OF EMBODIMENTS

One embodiment is a method of preparing a thermoplastic polyurethane, the method comprising: reacting 35 to 70 weight percent of a hydrogenated polydiene diol, 5 to 25 weight percent of a poly(alkylene oxide) diol, 2 to 10 weight percent of a chain extender, and 15 to 40 weight percent of a diisocyanate in the presence of a solvent to form the thermoplastic polyurethane.

Another embodiment is a thermoplastic polyurethane prepared by the method in any of its variations.

Another embodiment is a thermoplastic polyurethane comprising, based on the total weight of the polyurethane, 35 to 70 weight percent of repeat units derived from a hydrogenated polydiene diol, 5 to 25 weight percent of repeat units derived from a poly(alkylene oxide) diol, 2 to 10 weight percent of repeat units derived from a chain extender, and 15 to 40 weight percent of repeat units derived from a diisocyanate; wherein the thermoplastic polyurethane has a number average molecular weight of 50,000 to 250,000 grams/mole and a dispersity of 2.0 to 3.5, each determined by gel permeation chromatography with laser light-scattering detection; and wherein the thermoplastic polyurethane exhibits a tensile strength of 17 to 35 megapascals, measured according to ASTM D 412-15a at 23° C. and a test speed of 50 millimeters/minute.

Another embodiment is an article comprising the thermoplastic polyurethane in any of its variations.

These and other embodiments are described in detail below.

DETAILED DESCRIPTION

The present inventors have determined that segmented polyurethanes exhibiting an improved balance of tensile strength and elongation can be synthesized by a solution reaction of particular amounts of a hydrogenated polydiene diol, a poly(alkylene oxide) diol, a chain extender, and a diisocyanate.

An embodiment is a method of preparing a thermoplastic polyurethane, the method comprising reacting a polyol component and an isocyanate component, in particular reacting 35 to 70 weight percent of a hydrogenated polydiene diol, 5 to 25 weight percent of a poly(alkylene oxide) diol, 2 to 10 weight percent of a chain extender, and 15 to 40 weight percent of a diisocyanate in the presence of a solvent to form the thermoplastic polyurethane; wherein all weight percents are based on 100 weight percent total of the hydrogenated polydiene diol, the poly(alkylene oxide) diol, the chain extender, and the diisocyanate.

One reactant used to prepare the thermoplastic polyurethane is a hydrogenated polydiene diol. In the context of the hydrogenated polydiene diol, "hydrogenated" means that at least 98% of the aliphatic unsaturation present in the polydiene diol is reduced by hydrogenation. In some embodiments, at least 99% of the aliphatic unsaturation present in the polydiene diol is reduced by hydrogenation. As used herein, the term "polydiene diol" refers to a polymer of a conjugated diene terminated by a hydroxyl group at each end of the polymer. In some embodiments, the hydrogenated polydiene diol comprises a hydrogenated polybutadiene diol, a hydrogenated polyisoprene diol, or a combination thereof.

In some embodiments, the hydrogenated polydiene diol comprises a hydrogenated polybutadiene diol having a number average molecular weight of 500 to 4,000 grams/mole, or 500 to 2,000 grams/mole, or 500 to 1,500 grams/mole, as determined by gel permeation chromatography with laser light-scattering detection. In some embodiments, the hydrogenated polydiene diol has a number average molecular weight of 500 to 4,000 grams/mole. Within this range, the number average molecular weight can be 500 to 2,000 grams/mole.

In some embodiments, the polydiene diol before hydrogenation has a vinyl content of 60 to 90 mole percent, based on the moles of incorporated diene. In other words, 60 to 90 mole percent of the diene is incorporated into the polydiene via 1,2-addition, and 10 to 40 mole percent of the diene is incorporated via 1,4-addition. In some embodiments, the polydiene diol before hydrogenation has a vinyl content of 75 to 90 mole percent.

In a specific embodiment, the hydrogenated polydiene diol comprises a hydrogenated polybutadiene diol having a number average molecular weight of 500 to 2,000 grams/mole.

The thermoplastic polyurethane-forming reaction utilizes the hydrogenated polydiene diol in an amount of 35 to 70 weight percent, or 40 to 65 weight percent, based on 100 weight percent total of the hydrogenated polydiene diol, the poly(alkylene oxide) diol, the chain extender, and the diisocyanate.

Another reactant used to form the thermoplastic polyurethane is a poly(alkylene oxide) diol. Examples of poly(alkylene oxide) diols include, for example, poly(ethylene oxide) diols, poly(propylene oxide) diols, poly(tetramethylene oxide) diols, poly(ethylene oxide-co-propylene oxide) diols, poly(ethylene oxide-block-propylene oxide) diols, poly(tetrahydrofuran-co-ethylene oxide) diols, poly(tetrahydrofuran-block-ethylene oxide) diols, poly(tetrahydrofuran-co-propylene oxide) diols, poly(tetrahydrofuran-block-propylene oxide) diols, and combinations thereof.

In some embodiments, the poly(alkylene oxide) diol has a number average molecular weight of 100 to 4,000 grams/mole, or 500 to 2,000 gram/mole.

In a specific embodiment, the poly(alkylene oxide) diol comprises a poly(tetramethylene oxide) diol having a number average molecular weight of 500 to 2,000 grams/mole.

The thermoplastic polyurethane-forming reaction utilizes the poly(alkylene oxide) diol in an amount of 5 to 25 weight percent, or 10 to 20 weight percent, based on 100 weight percent total of the hydrogenated polydiene diol, the poly(alkylene oxide) diol, the chain extender, and the diisocyanate.

In some embodiments of the method, the hydrogenated polydiene diol and the poly(alkylene oxide) diol are used in a weight ratio of 2.3:1 to 14:1, specifically 3.5:1 to 14:1.

Another reactant used to form the thermoplastic polyurethane is a chain extender. In some embodiments, the chain extender comprises a $C_3$-$C_{12}$ alkylene diol, a $C_3$-$C_{12}$ alkylene diamine, or a combination thereof. Specific examples of chain extenders include 1,4-butanediol, 1,5-pentanediol, 1,6-hexanediol, 1,8-octanediol, 1,9-nonanediol, 1,10-decanediol, 1,12-dodacanediol, 1,4-cyclohexanedimethanol, p-xyleneglycol, 1,4-bis(2-hydroxyethoxy) benzene, 2,2-dimethyl-1,3-propanediol, 2-methyl-1,3-propanediol, 1,4-diaminobutane, 1,5-diaminopentane, 1,6-diaminohexane, 1,8-diaminooctane, 1,9-diaminononane, 1,10-diaminodecane, 1,12-diaminododecane, 1,4-diaminocyclohexane, 2,5-diaminoxylene, isophoronediamine, and combinations thereof. In some embodiments, the chain extender comprises 1,4-butanediol. In some embodiments, the chain extender is a straight-chain saturated diol.

The thermoplastic polyurethane-forming reaction utilizes the chain extender in an amount of 2 to 10 weight percent, or 3 to 8 weight percent, based on 100 weight percent total of the hydrogenated polydiene diol, the poly(alkylene oxide) diol, the chain extender, and the diisocyanate.

Other polyols and polyamines are known for use in the formation of thermoplastic polyurethanes, and can be present as a part of the polyol component, provided that the presence of such polyols and polyamines does not significantly adversely affect the desired properties of the thermoplastic polyurethanes, in particular the balance of tensile strength and elongation. Other polyols include, for example, polyester polyols such as the polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Exemplary dicarboxylic acids and derivatives of dicarboxylic acids useful for producing polycondensation polyester polyols are aliphatic or cycloaliphatic dicarboxylic acids such as glutaric, adipic, sebacic, fumaric and maleic acids; dimeric acids; aromatic dicarboxylic acids such as phthalic, isophthalic and terephthalic acids; tribasic or higher functional polycarboxylic acids such as pyromellitic acid; as well as anhydrides and second alkyl esters, such as maleic anhydride, phthalic anhydride and dimethyl terephthalate. The polymers of lactones can be used, including lactones such as δ-valerolactone; ε-caprolactone; zeta-enantholactone; and the monoalkyl-valerolactones (e.g., the monomethyl-, monoethyl-, and monohexyl-valerolactones)

If present, the total amount of other polyol or polyamine are generally used in amounts of less than 20 weight percent, or less than 10 weight percent, or greater than zero to 5 weight percent, each based on the total weight of the isocyanate component, each based on the total weight of the polyol and polyamine component. In an embodiment, no polyol component other than the hydrogenated polydiene diol, the poly(alkylene oxide) diol, and the chain extender is used in the polyol component.

Another reactant used to form the thermoplastic polyurethane is a diisocyanate. Examples of diisocyanates include, for example, 4,4'-methylene diphenyl diisocyanate, 2,2'-dimethyl-4,4'-biphenyldiisocyanate, 3,3'-dimethyl-4,4'-diphenyl diisocyanate, methylene diisocyanate, m-phenylene diisocyanate, p-phenylene diisocyanate, cyclohexane-1,4-diisocyanates, 1,6-hexamethylene diisocyanate, toluene-2,4-diisocyanate, toluene-2,6-diisocyanate, p-xylylene diisocyanate, m-xylylene diisocyanate, p-tetramethylxylene diisocyanate (1,4-bis(1-isocyanato-1-methylethyl)benzene), m-tetramethylxylene diisocyanate (1,3-bis(1-isocyanato-1-methylethyl)benzene), isophorone diisocyanate (5-isocyanato-1-(isocyanatomethyl)-1,3,3-trimethylcyclohexane), bis(4-isocyanatocyclohexyl) methane, naphthalene-1,9-diisocyanate, and combinations thereof. In some embodiments, aliphatic diisocyanates and alicyclic diisocyanates are excluded from the reaction and the polyurethane product, such that the polyurethane does not comprise units derived from aliphatic diisocyanates or alicyclic diisocyanates.

The thermoplastic polyurethane-forming reaction utilizes the diisocyanate in an amount of 15 to 40 weight percent, or 20 to 35 weight percent, based on 100 weight percent total of the hydrogenated polydiene diol, the poly(alkylene oxide) diol, the chain extender, and the diisocyanate.

It is also possible to use polymeric isocyanates such as polymethylene polyphenylisocyanate, or polyisocyanates having an isocyanate functionality greater than 3, for example triisocyanates, tetraisocyanates, and the like, to achieve various properties in the thermoplastic polyurethane. If present, polyisocyanates having an isocyanate functionality greater than 3 are used in the isocyanate component in an amount of less than 10 weight percent, or less than 5 weight percent, or greater than zero to 2 weight percent, each based on the total weight of the isocyanate component. In some embodiments no isocyanate component other than a diisocyanate is used in the isocyanate component.

The thermoplastic polyurethane-forming reaction comprises reacting the hydrogenated polydiene diol, the poly(alkylene oxide) diol, the chain extender, and the diisocyanate in the presence of a solvent to form the thermoplastic polyurethane. Suitable solvents include, for example, toluene, o-xylene, m-xylene, p-xylene, ethylbenzene, tetrahydrofuran, and combinations thereof.

In some embodiments, the solvent amount is 5 to 50 weight percent, based on the total weight of the hydrogenated polydiene diol, the poly(alkylene oxide) diol, the chain extender, the diisocyanate, and the solvent. Within this range, the solvent amount can be 10 to 40 weight percent, or 15 to 35 weight percent.

A catalyst for urethane formation can optionally be present. Suitable catalysts are known in the art, and include, for example, organometallic compounds such titanate esters; tin compounds such as stannous diacetate, stannous dioctoate, stannous dilaurate, or the dialkyltin salts of aliphatic carboxylic acids, e.g., dibutyltin diacetate, dibutyltin dilaurate, or the like; or iron compounds, such as a compound of Fe(III) or Fe(II) containing one, two or three ligands derived, for example, from a β-diketone, β-ketoester, β-ketoamide, or diimine such as acetylacetate, 2,2'-bipyridine, 1,10-phenanthroline, substituted variants of 2,2'-bipyridine or 1,10-phenanthroline. However, in some embodiments, for example where the polyurethane is to be used in a medical application, an organometallic catalyst, in particular a tin-containing catalyst, is not used. In these or other embodiments the catalyst can be a tertiary amine or a polyalcohol amine, examples being triethylamine, dimethylcyclohexylamine, N-methylmorpholine, N,N'-dimethylpiperazine, diazabicyclo-[2.2.2] octane, 2-(dimethylaminoethoxy)ethanol, triethanolamine, diethanolamine, diisopropanolamine, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, N-allyl diethanolamine, N-methyl diisopropanolamine, N-ethyl diisopropanolamine, N-propyl diisopropanolamine, N-butyl diisopropanolamine, cyclohexyl diisopropanolamine, bis(2-hydroxyethyl)amino-2-propanol, 2-bis(2-hydroxyethyl) amino-2-(hydroxymethyl)-1,3-propanediol, 1,3-bis[tris(hydroxymethyl)methylamino]propane, N,N'-bis (hydroxyethylene)ethylenediamine, 1-[N,N-bis (2-hydroxyethyl)amino]-2-propanol, 1,4-bis(hydroxyethylpiperazine), 1-[2-(2-hydroxyethoxy) ethyl]piperazine, or 2,2-bis(hydroxymethyl)-2,2',2"-nitrilotriethanol.

The catalyst can be used in the polyurethane forming reaction in amounts of 0.075 to 2.0 mole percent, or 0.085 to 1.75 mole percent, or 0.095 to about 1.5 mole percent, based on the total moles of the hydrogenated polydiene diol, the poly(alkylene oxide) diol, the chain extender, and the diisocyanate.

General reaction conditions for the formation of thermoplastic polyurethanes are known and can be used. For example, the components of the reaction can be dried to a moisture content of 0.05 percent maximum. The components can be combined at a temperature of 100 to 180° C., e.g., at about 110 to 150° C. to produce a polyurethane also known as a "greenstock", which can be in the form of a gel or other malleable shape. The greenstock can optionally be isolated or shaped into a pellet, sheet, strand, or other shape, and is subsequently aged until the residual isocyanate content is below a desired amount, or essentially nil. Aging can be at 60 to 140° C. for 1 hour to 14 days depending on the temperature, particular reactants, and level of catalyst (if any) used.

In some embodiments, a "one-shot" bulk polymerization process can be used, wherein the hydrogenated polydiene diol, the poly(alkylene oxide) diol, and the chain extender are thoroughly mixed with optional vacuum stripping first and then with nitrogen gas purging for 1 to 24 hours. At ambient temperature, the calculated quantity of diisocyanate is added all at once with very vigorous stirring to initiate the reaction. In some embodiments, reactive extrusion is not used.

Alternatively, the thermoplastic polyurethanes can be formed in a two-step process. In a representative two-step process, the entire quantities of the hydrogenated polydiene diol or the poly(alkylene oxide) diol and diisocyanate are charged to a reactor in a first step and reacted to form an isocyanate terminated prepolymer. Then the chain extender is added and reacted with the pre-polymer under conditions forming a thermoplastic polyurethane (i.e., non-cross-linking conditions). An advantage of the reaction is that it does not require pre-reaction of the hydrogenated polydiene diol with the diisocyanate before addition of the poly(alkylene oxide) diol. Thus, in some embodiments, reacting comprises adding the diisocyanate to a solution comprising the hydrogenated polydiene diol, the poly(alkylene oxide) diol, and the solvent, followed by the chain extender.

The reaction produces thermoplastic polyurethanes with a desirable balance of tensile strength and tensile elongation. Thus, in some embodiments, the thermoplastic polyurethane exhibits a tensile strength of 17 to 35 megapascals, or 18 to 30 megapascals, or 20 to 30 megapascals, measured according to ASTM D 412-15a at 23° C. and a test speed of 50 millimeters/minute. And in some embodiments, the thermoplastic polyurethane further exhibits a tensile elongation at break of 400 to 1,200 percent, or 450 to 1,000 percent, measured according to ASTM D 412-15a at 23° C. and a test speed of 50 millimeters/minute.

The method is capable of synthesizing thermoplastic polyurethanes with relatively high molecular weights and relative low dispersities. For example, in some embodiments, the thermoplastic polyurethane has a number average molecular weight of 50,000 to 250,000 grams/mole, or 70,000 to 200,000 grams/mole, and a dispersity (weight average molecular weight divided by number average molecular weight) of 2.0 to 3.5, or 2.2 to 3.2. Molecular weight characteristics can be determined by gel permeation chromatography with laser light-scattering detection.

In a specific embodiment of the method, the reacting comprises adding the diisocyanate to a solution comprising the hydrogenated polydiene diol, the poly(alkylene oxide) diol, and the solvent; the hydrogenated polydiene diol comprises a hydrogenated polybutadiene diol having a number average molecular weight of 500 to 2,000 grams/mole; the poly(alkylene oxide) diol comprises a poly(tetramethylene oxide) diol having a number average molecular weight of 500 to 2,000 grams/mole; the thermoplastic polyurethane has a number average molecular weight of 50,000 to 250,000 grams/mole and a dispersity of 2.0 to 3.5, each determined by gel permeation chromatography with laser light-scattering detection; and the thermoplastic polyurethane exhibits a tensile strength of 17 to 35 megapascals, and a tensile elongation at break of 400 to 1,200 percent, each measured according to ASTM D 412-15a at 23° C. and a test speed of 50 millimeters/minute.

Another embodiment is a thermoplastic polyurethane prepared by the method in any of its above-described variations.

Another embodiment is a thermoplastic polyurethane comprising, based on the total weight of the polyurethane, 35 to 70 weight percent of repeat units derived from a hydrogenated polydiene diol, 5 to 25 weight percent of repeat units derived from a poly(alkylene oxide) diol, 2 to 10 weight percent of repeat units derived from a chain extender, and 15 to 40 weight percent of repeat units derived from a diisocyanate; wherein the thermoplastic polyurethane has a number average molecular weight of 50,000 to 250,000 grams/mole, or 70,000 to 200,000 grams/mole, and a dispersity of 2.0 to 3.5, or 2.2 to 3.2, each determined by gel permeation chromatography with laser light-scattering detection; and wherein the thermoplastic polyurethane exhibits a tensile strength of 17 to 35 megapascals, or 18 to 30 megapascals, or 20 to 30 megapascals, measured according to ASTM D 412-15a at 23° C. and a test speed of 50 millimeters/minute.

In a specific embodiment of the thermoplastic polyurethane, the hydrogenated polydiene diol comprises a hydrogenated polybutadiene diol having a number average molecular weight of 500 to 2,000 grams/mole; the poly (alkylene oxide) diol comprises a poly(tetramethylene oxide) diol having a number average molecular weight of 500 to 2,000 grams/mole; and the thermoplastic polyurethane further exhibits a tensile elongation at break of 400 to 1,200 percent, or 450 to 1,000 percent, measured according to ASTM D 412-15a at 23° C. and a test speed of 50 millimeters/minute.

Another embodiment is an article comprising the thermoplastic polyurethane in any of its above-described variations. Examples of such articles or portions thereof include foams, films, fibers, fabrics (including woven and nonwoven fabrics), coatings (including sprayed coatings), sheets, tubes, adhesives, automotive instrument panels, power tool casings, casings for mobile electronic devices, sporting goods, clothing, footwear, gloves, condoms, and medical devices (including surgical instruments, cardiac pacemakers, pacemaker leads, defibrillator leads, defibrillators, catheters, implantable prostheses, cardiac assist devices, artificial organs, blood pumps, balloon pumps, intra-aortic balloons, inflatable implants, gastric balloons, arteriovenous shunts, biosensors, microscale encapsulation devices, membranes for cell encapsulation, drug delivery devices, wound dressings, tissue adhesives, artificial joints, orthopedic implants, and breast implants and other soft tissue replacements).

The invention is further illustrated by the following non-limiting examples.

Comparative Example 1

To a 100 milliliter (mL) three-neck, round-bottom flask equipped with mechanical stirring and nitrogen purging, 3.25 grams (g) hydrogenated polybutadiene diol (Total Cray Valley, number average molecular weight ($M_n$)=2000 grams/mole (g/mol)) was added and dried by azeotropic distillation of toluene under vacuum. 20 mL dry toluene was then added. After the polymer was dissolved in toluene, 1.40 g 4,4'-methylenebis(phenyl isocyanate) was added. The mixture was stirred at 100° C. for 2 hours (h), and then 0.35 g 1,4-butanediol and 0.91 milligrams (mg) tin (II) 2-ethylhexanoate were added. The mixture was further stirred at 100° C. for 4 h and cooled to room temperature, creating a gel. The polymer was cured at room temperature under nitrogen purging for 1 week and then dried at 70° C. under vacuum overnight to remove residual solvent. Polyurethane number average molecular weight ($M_n$), weight average molecular weight ($M_w$), and dispersity ($M_w/M_n$) were determined by gel permeation chromatography with laser light-scattering detection: $M_n$=90,000 g/mol, dispersity ($M_w/M_n$)= 2.4.

Samples for tensile measurements were prepared by compression molding at 180° C. using a Carver model 'C' press (12 tons) equipped with a temperature control unit. About 2 g TPU sample was weighed and placed into a thin rectangular aluminum mold with the dimensions of 70 by 60 by 0.25 millimeters (mm) and sandwiched with Teflon-coated aluminum foil. Pressure was increased in steps until 90 kiloNewtons (kN) and 4 aerations were carried out at 20, 40, 60, and 80 kN load. At the end the pressure was released, the sample was removed and cooled to room temperature. The polyurethane sheet had a hard phase content of 35 weight percent and a Shore A hardness of 80 A. Tensile properties were measured according to ASTM D 412-15a at 23° C. with a 50 newton (N) load cell on an Instron Model Tensile Tester 4400R at 50 mm/min extension rate. Samples were cut from cast films into dog-bone shape test articles using an ASTM standard half size die. The thickness of the films was in the range of 0.2 to 0.3 mm. For each sample, at least three specimens were measured. Tensile strength=16 megapascals (MPa), elongation at break=300%.

Example 1

To a 100-mL, three-neck, round-bottom flask equipped with mechanical stirring and nitrogen purging, 2.60 g hydrogenated polybutadiene diol and 0.65 g poly(tetramethyleneoxide) diol (Aldrich, $M_n$=1000 g/mol) were added and dried by azeotropic distillation of toluene under vacuum. 20 mL dry toluene was then added. After the polymers were dissolved in toluene, 1.42 g 4,4'-methylenebis(phenyl isocyanate) was added. The mixture was stirred at 100° C. for 2 h, and then 0.33 g 1,4-butanediol, and 0.92 mg tin (II) 2-ethylhexanoate were added. The mixture was further stirred at 100° C. for 4 h and cooled to room temperature. The polymer was cured at room temperature under nitrogen purging for 1 week and then dried at 70° C. under vacuum overnight to remove residual solvent. Molecular weight characteristics were determined as described for Comparative Example 1. $M_n$=130,000 g/mol, dispersity ($M_w/M_n$)= 2.4.

Samples for tensile measurements were prepared and the tensile properties were determined as described for Comparative Example 1. Tensile strength=25 MPa, elongation at break=520%. The polyurethane sheet had a hard phase content of 35% and a Shore A hardness of 80 A.

Example 2

To a 100-mL, three-neck, round bottom flask equipped with mechanical stirring and nitrogen purging, 2.92 g hydrogenated polybutadiene diol and 0.73 g poly(tetramethyleneoxide) diol (Aldrich, $M_n$=1000 g/mol) were added and dried by azeotropic distillation of toluene under vacuum. 20 mL dry toluene was then added. After the polymers were dissolved in toluene, 1.14 g 4,4'-methylenebis(phenyl isocyanate) was added. The mixture was stirred at 100° C. for 2 h, and then 0.21 g 1,4-butanediol, and 0.74 mg tin (II) 2-ethylhexanoate were added. The mixture was further stirred at 100° C. for 4 h and cooled to room temperature. The polymer was cured at room temperature under nitrogen purging for 1 week and then dried at 70° C. under vacuum overnight to remove residual solvent. Molecular weight characteristics were determined as described for Comparative Example 1. $M_n$=108,000 g/mol, dispersity ($M_w/M_n$)= 2.9.

Samples for tensile measurements were prepared and the tensile properties were determined as described for Comparative Example 1. Tensile strength=20 MPa, elongation at break=830%. The polyurethane sheet had a hard phase content of 27% and a Shore A hardness of 65 A.

Example 3

To a 1-L, three-neck, round-bottom flask equipped with mechanical stirring and nitrogen purging, 15.6 g hydrogenated polybutadiene diol and 3.9 g poly(tetramethyleneoxide) diol (Aldrich, $M_n$=1000 g/mol) were added and dried by azeotropic distillation of toluene, under vacuum. 100 mL dry toluene was then added. After the polymers were dissolved in toluene, 8.64 g 4,4'-methylenebis(phenyl isocyanate) was added. The mixture was stirred at 100° C. for 2 h, and then 1.92 g 1,4-butanediol, and 0.0056 g tin (II) 2-ethylhexanoate were added. The mixture was further stirred at 100° C. for 4 h and cooled to room temperature. The polymer was cured at room temperature under nitrogen purging for 1 week and then dried at 70° C. under vacuum overnight to remove residual solvent.

Samples for tensile measurements were prepared and the tensile properties were determined as described for Comparative Example 1. Tensile strength=28 MPa, elongation at break=570%. The polyurethane sheet had a hard phase content of 35% and a Shore A hardness of 80 A.

The invention includes at least the following embodiments.

Embodiment 1: A method of preparing a thermoplastic polyurethane, the method comprising: reacting 35 to 70 weight percent of a hydrogenated polydiene diol, 5 to 25 weight percent of a poly(alkylene oxide) diol, 2 to 10 weight percent of a chain extender, and 15 to 40 weight percent of a diisocyanate in the presence of a solvent to form the thermoplastic polyurethane; wherein weight percent values are based on 100 weight percent total of the hydrogenated polydiene diol, the poly(alkylene oxide), the chain extender, and the diisocyanate.

Embodiment 2: The method of embodiment 1, wherein the reacting comprises adding the diisocyanate to a solution comprising the hydrogenated polydiene diol, the poly(alkylene oxide) diol, and the solvent.

Embodiment 3: The method of embodiment 1 or 2, wherein the hydrogenated polydiene diol is a hydrogenated polybutadiene diol, hydrogenated polyisoprene diol, or combination thereof.

Embodiment 4: The method of any one of embodiments 1-3, wherein the hydrogenated polydiene diol is the product of hydrogenating a polydiene diol having a vinyl content of 75 to 90 mole percent, based on moles of diene incorporated into the polydiene diol.

Embodiment 5: The method of any one of embodiments 1-4, wherein the hydrogenated polydiene diol has a number average molecular weight of 500 to 4,000 grams/mole.

Embodiment 6: The method of any one of embodiments 1-5, wherein the hydrogenated polydiene diol comprises a hydrogenated polybutadiene diol having a number average molecular weight of 500 to 4,000 grams/mole, preferably 500 to 2,000 grams/mole.

Embodiment 7: The method of any one of embodiments 1-6, wherein the poly(alkylene oxide) diol is a poly(ethylene oxide) diol, poly(propylene oxide) diol, poly(tetramethylene oxide) diol, poly(ethylene oxide-co-propylene oxide) diol, poly(ethylene oxide-block-propylene oxide) diol, poly(tetrahydrofuran-co-ethylene oxide) diol, poly(tetrahydrofuran-block-ethylene oxide) diol, poly(tetrahydrofuran-co-propylene oxide) diol, poly(tetrahydrofuran-block-propylene oxide) diol, or combination thereof.

Embodiment 8: The method of any one of embodiments 1-7, wherein the poly(alkylene oxide) diol has a number average molecular weight of 100 to 4,000 grams/mole, preferably 100 to 2,000 grams/mole.

Embodiment 9: The method of any one of embodiments 1-8, wherein the poly(alkylene oxide) diol comprises a poly(tetramethylene oxide) diol having a number average molecular weight of 500 to 2,000 grams/mole.

Embodiment 10: The method of any one of embodiments 1-9, wherein the hydrogenated polydiene diol and the poly(alkylene oxide) diol are used in a weight ratio of 3.5:1 to 14:1.

Embodiment 11: The method of any one of embodiments 1-10, wherein the chain extender comprises a $C_3$-$C_{12}$ alkylene diol, a $C_3$-$C_{12}$ alkylene diamine, or a combination thereof.

Embodiment 12: The method of any one of embodiments 1-11, wherein the diisocyanate is 4,4'-methylene diphenyl diisocyanate, methylene diisocyanate, m-phenylene diisocyanate, p-phenylene diisocyanate, cyclohexane-1,4-diisocyanates, 1,6-hexamethylene diisocyanate, toluene-2,4-diisocyanate, toluene-2,6-diisocyanate, p-xylylene diisocyanate, m-xylylene diisocyanate, p-tetramethylxylene diisocyanate, m-tetramethylxylene diisocyanate, isophorone diisocyanate, bis(4-isocyanatocyclohexyl)methane, naphthalene diisocyanate, or combination thereof.

Embodiment 13: The method of any one of embodiments 1-12, wherein the solvent is selected from the group consisting of toluene, o-xylene, m-xylene, p-xylene, ethylbenzene, tetrahydrofuran, or combination thereof.

Embodiment 14: The method of any one of embodiments 1-13, wherein the thermoplastic polyurethane exhibits a tensile strength of 17 to 35 megapascals, measured according to ASTM D 412-15a at 23° C. and a test speed of 50 millimeters/minute.

Embodiment 15: The method of embodiment 14, wherein the thermoplastic polyurethane further exhibits a tensile elongation at break of 400 to 1,200 percent, measured according to ASTM D 412-15a at 23° C. and a test speed of 50 millimeters/minute.

Embodiment 16: The method of any of embodiments 1-15, wherein the thermoplastic polyurethane has a number average molecular weight of 50,000 to 250,000 grams/mole and a dispersity of 2.0 to 3.5, each determined by gel permeation chromatography with laser light-scattering detection.

Embodiment 17: The method of embodiment 1, wherein the reacting comprises adding the diisocyanate to a solution comprising the hydrogenated polydiene diol, the poly(alkylene oxide) diol, and the solvent; wherein the hydrogenated polydiene diol comprises a hydrogenated polybutadiene diol having a number average molecular weight of 500 to 2,000 grams/mole; wherein the poly(alkylene oxide) diol comprises a poly(tetramethylene oxide) diol having a number average molecular weight of 500 to 2,000 grams/mole; wherein the thermoplastic polyurethane has a number average molecular weight of 50,000 to 250,000 grams/mole and a dispersity of 2.0 to 3.5, each determined by gel permeation chromatography with laser light-scattering detection; and wherein the thermoplastic polyurethane exhibits a tensile strength of 17 to 35 megapascals, and a tensile elongation at break of 400 to 1,200 percent, each measured according to ASTM D 412-15a at 23° C. and a test speed of 50 millimeters/minute.

Embodiment 18: A thermoplastic polyurethane prepared by the method of any one of embodiments 1-17.

Embodiment 19: A thermoplastic polyurethane comprising, based on the total weight of the polyurethane, 35 to 70 weight percent of repeat units derived from a hydrogenated polydiene diol, 5 to 25 weight percent of repeat units derived from a poly(alkylene oxide) diol, 2 to 10 weight percent of repeat units derived from a chain extender, and 15 to 40 weight percent of repeat units derived from a diisocyanate; wherein the thermoplastic polyurethane has a number average molecular weight of 50,000 to 250,000 grams/mole and a dispersity of 2.0 to 3.5, each determined by gel permeation chromatography with laser light-scattering detection; and wherein the thermoplastic polyurethane exhibits a tensile strength of 17 to 35 megapascals, measured according to ASTM D 412-15a at 23° C. and a test speed of 50 millimeters/minute.

Embodiment 20: The thermoplastic polyurethane of embodiment 19, wherein the hydrogenated polydiene diol comprises a hydrogenated polybutadiene diol having a number average molecular weight of 500 to 2000 grams/mole; wherein the poly(alkylene oxide) diol comprises a poly(tetramethylene oxide) diol having a number average molecular weight of 500 to 2,000 grams/mole; and wherein the thermoplastic polyurethane further exhibits a tensile elongation at break of 400 to 1,200 percent, measured according to ASTM D 412-15a at 23° C. and a test speed of 50 millimeters/minute.

Embodiment 21: The thermoplastic polyurethane of embodiment 19 or 20, wherein the repeat units derived from the hydrogenated polydiene diol and the repeat units derived from the poly(alkylene oxide) diol are present in a weight ratio of 3.5:1 to 14:1.

Embodiment 22: An article comprising the thermoplastic polyurethane of any one of embodiments 18 to 21.

All ranges disclosed herein are inclusive of the endpoints, and the endpoints are independently combinable with each other. Each range disclosed herein constitutes a disclosure of any point or sub-range lying within the disclosed range. The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function and/or objectives of the compositions, methods, and articles. "Combinations" is inclusive of blends, mixtures, alloys, reaction products, and the like. "A combination thereof" is inclusive of any combination containing one or more of the elements named, optionally together a like element not named. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments. Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of preparing a thermoplastic polyurethane, the method comprising:
reacting
35 to 70 weight percent of a hydrogenated polydiene diol,
5 to 25 weight percent of a poly(alkylene oxide) diol,
2 to 10 weight percent of a chain extender, and
15 to 40 weight percent of a diisocyanate
in the presence of a solvent to form the thermoplastic polyurethane; wherein weight percent values are based on 100 weight percent total of the hydrogenated polydiene diol, the poly(alkylene oxide) diol, the chain extender, and the diisocyanate.

2. The method of claim 1, wherein the reacting comprises adding the diisocyanate to a solution comprising the hydrogenated polydiene diol, the poly(alkylene oxide) diol, and the solvent.

3. The method of claim 1, wherein the hydrogenated polydiene diol is a hydrogenated polybutadiene diol, hydrogenated polyisoprene diol, or combination thereof.

4. The method of claim 1, wherein the hydrogenated polydiene diol is the product of hydrogenating a polydiene diol having a vinyl content of 75 to 90 mole percent, based on moles of diene incorporated into the polydiene diol.

5. The method of claim 1, wherein the hydrogenated polydiene diol has a number average molecular weight of 500 to 4,000 grams/mole.

6. The method of claim 1, wherein the poly(alkylene oxide) diol is a poly(ethylene oxide) diol, poly(propylene oxide) diol, poly(tetramethylene oxide) diol, poly(ethylene oxide-co-propylene oxide) diol, poly(ethylene oxide-block-propylene oxide) diol, poly(tetrahydrofuran-co-ethylene oxide) diol, poly(tetrahydrofuran-block-ethylene oxide) diol, poly(tetrahydrofuran-co-propylene oxide) diol, poly(tetrahydrofuran-block-propylene oxide) diol, or combination thereof.

7. The method of claim 1, wherein the poly(alkylene oxide) diol has a number average molecular weight of 100 to 4,000 grams/mole.

8. The method of claim 1, wherein the hydrogenated polydiene diol and the poly(alkylene oxide) diol are used in a weight ratio of 2.3:1 to 14:1.

9. The method of claim 1, wherein the chain extender comprises a $C_3$-$C_{12}$ alkylene diol, a $C_3$-$C_{12}$ alkylene diamine, or a combination thereof.

10. The method of claim 1, wherein the diisocyanate is 4,4'-methylene diphenyl diisocyanate, methylene diisocyanate, m-phenylene diisocyanate, p-phenylene diisocyanate, cyclohexane-1,4-diisocyanates, 1,6-hexamethylene diisocyanate, toluene-2,4-diisocyanate, toluene-2,6-diisocyanate, p-xylylene diisocyanate, m-xylylene diisocyanate, p-tetramethylxylene diisocyanate, m-tetramethylxylene diisocyanate, isophorone diisocyanate, bis(4-isocyanatocyclohexyl)methane, naphthalene diisocyanate, or combination thereof.

11. The method of claim 1, wherein the thermoplastic polyurethane exhibits a tensile strength of 17 to 35 megapascals, measured according to ASTM D 412-15a at 23° C. and a test speed of 50 millimeters/minute.

12. The method of claim 11, wherein the thermoplastic polyurethane further exhibits a tensile elongation at break of 400 to 1,200 percent, measured according to ASTM D 412-15a at 23° C. and a test speed of 50 millimeters/minute.

13. The method of claim 1, wherein the thermoplastic polyurethane has a number average molecular weight of 50,000 to 250,000 grams/mole and a dispersity of 2.0 to 3.5, each determined by gel permeation chromatography with laser light-scattering detection.

14. The method of claim 1,
- wherein the reacting comprises adding the diisocyanate to a solution comprising the hydrogenated polydiene diol, the poly(alkylene oxide) diol, and the solvent;
- wherein the hydrogenated polydiene diol comprises a hydrogenated polybutadiene diol having a number average molecular weight of 500 to 2,000 grams/mole;
- wherein the poly(alkylene oxide) diol comprises a poly(tetramethylene oxide) diol having a number average molecular weight of 500 to 2,000 grams/mole;
- wherein the thermoplastic polyurethane has a number average molecular weight of 50,000 to 250,000 grams/mole and a dispersity of 2.0 to 3.5, each determined by gel permeation chromatography with laser light-scattering detection; and
- wherein the thermoplastic polyurethane exhibits a tensile strength of 17 to 35 megapascals, and a tensile elongation at break of 400 to 1,200 percent, each measured according to ASTM D 412-15a at 23° C. and a test speed of 50 millimeters/minute.

15. A thermoplastic polyurethane comprising, based on the total weight of the polyurethane,
- 35 to 70 weight percent of repeat units derived from a hydrogenated polydiene diol,
- 5 to 25 weight percent of repeat units derived from a poly(alkylene oxide) diol,
- 2 to 10 weight percent of repeat units derived from a chain extender, and
- 15 to 40 weight percent of repeat units derived from a diisocyanate;
- wherein the thermoplastic polyurethane has a number average molecular weight of 50,000 to 250,000 grams/mole and a dispersity of 2.0 to 3.5, each determined by gel permeation chromatography with laser light-scattering detection; and
- wherein the thermoplastic polyurethane exhibits a tensile strength of 17 to 35 megapascals, measured according to ASTM D 412-15a at 23° C. and a test speed of 50 millimeters/minute.

16. The thermoplastic polyurethane of claim 15,
- wherein the hydrogenated polydiene diol comprises a hydrogenated polybutadiene diol having a number average molecular weight of 500 to 2,000 grams/mole;
- wherein the poly(alkylene oxide) diol comprises a poly(tetramethylene oxide) diol having a number average molecular weight of 500 to 2,000 grams/mole; and
- wherein the thermoplastic polyurethane further exhibits a tensile elongation at break of 400 to 1,200 percent, measured according to ASTM D 412-15a at 23° C. and a test speed of 50 millimeters/minute.

17. The thermoplastic polyurethane of claim 15, wherein the repeat units derived from the hydrogenated polydiene diol and the repeat units derived from the poly(alkylene oxide) diol are present in a weight ratio of 2.3:1 to 14:1.

* * * * *